C. H. MUCKENHIRN.

LIGHT DIFFUSER FOR AUTOMOBILE HEADLIGHTS.

APPLICATION FILED FEB. 4, 1918.

Reissued Apr. 23, 1918.

14,463.

Inventor:
Charles H. Muckenhirn,
by Macomber & Evans
Attys.

UNITED STATES PATENT OFFICE.

CHARLES H. MUCKENHIRN, OF DETROIT, MICHIGAN.

LIGHT-DIFFUSER FOR AUTOMOBILE-HEADLIGHTS.

14,463. Specification of Reissued Letters Patent. Reissued Apr. 23, 1918.

Original No. 1,233,495, dated July 17, 1917, Serial No. 136,028, filed December 9, 1916. Application for reissue filed February 4, 1918. Serial No. 215,361.

*To all whom it may concern:*

Be it known that I, CHARLES H. MUCKENHIRN, citizen of the United States, residing at Detroit, in the county of Wayne and State of Michigan, have invented certain new and useful Improvements in Light-Diffusers for Automobile-Headlights, of which the following is a specification, reference being had therein to the accompanying drawing.

This invention relates to an improved light diffuser for vehicle head lights particularly lights of powerful glare and blinding effect used on motor vehicles. Heretofore many suggestions have been made and devices produced for reducing the glare or "dimming the light," but it has been found that such dimmers have as a rule so curtained the light that an effective illumination of the road is prevented. The present invention as distinguished from a dimmer is designed as a light diffuser modifying the glare of the powerful head lights now employed, but diffusing the light over a wide area so that the road surface is well illuminated. The invention comprehends generally an inexpensive film like structure having diffusing characteristics and which can be readily placed across the lens of head lights. Many head lights are now made with expensive diffusing lenses, the lenses costing many dollars apiece. The present invention is designed to be used with an ordinary head light lens and to be quickly attached and detached therefrom.

In the accompanying drawing is shown the form of diffuser, but the special configuration of the diffusing points may be widely changed and varied according to the desire of the manufacturer.

Figure 1:
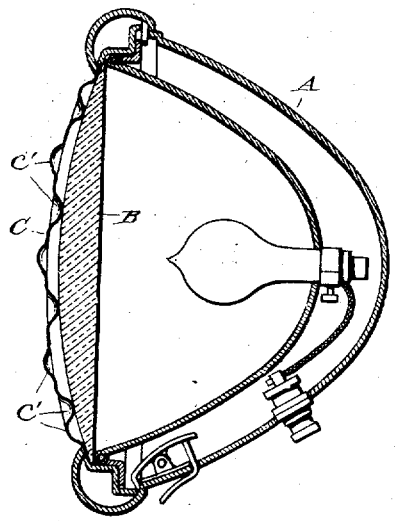
Figure 1 represents a vertical section through a head light showing the lens with a diffusing film applied thereto.
Figure 2:
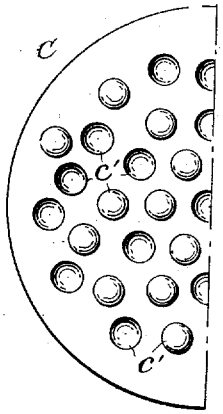
Fig. 2 is an elevation of a diffusing film.
Figure 3:
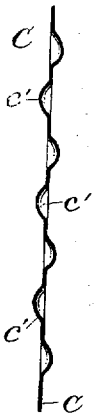
Fig. 3 is an edge view in section.
Figure 4:
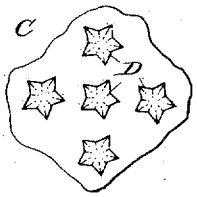
Fig. 4 is a modified form of a diffusing film.

In the drawing A represents the usual head light having a lens B secured in position at the beaded edge in any convenient or well known manner. Interposed between the outer face of the lens B and the beaded edge of the light casing is a diffusing film C the same being conveniently of a size corresponding with that of the lens and is placed over the lens as shown in Fig. 1 of the drawing. The film C is composed of a transparent fleixble sheet which may be of celluloid, water glass or any other convenient film like substance which is transparent. The film is molded or formed with a series of diffusing protuberances or depressions $c'$ or as shown in Fig. 4 with starlike representations D. Some of the diffusing points of the film are conveniently projected inward and others outward but various different arrangements of course can be resorted to and different types of diffusing points may be employed either in clusters or in symmetrical arrangement as specifically shown in the drawing.

In applying the film to the head light lens the film is first placed over the lens, the lens inserted in the beaded edge of the body of the light and then clamped thus retaining the film in fixed position over the lens. Owing to the clear transparent characteristics of the film the light will pass therethrough, but meeting with the various diffusing points will be projected in a manner well known in lenses giving or producing a wide extended range of illumination while subduing the objectionable glare of the head light.

The diffusing films described can be made and sold at a very low cost, can be readily applied by the user of the machine and the effect when in use will be substantially the effect of the more expensive diffusing lenses now employed. The device may be characterized as a supplemental face for the head light having lens diffusing characteristics and owing to the fact that the material is flexible and of film nature the same will be readily conformed to the contour or convexity of the lens. If desired the film material may be slightly tinted but this is not necessary for securing the diffusing effect desired.

Having thus described the invention what I claim as new and desire to secure by Letters Patent is:

1. A diffusing device for head lights consisting of a thin flexible transparent film-like member adapted to cover the face of a lens and provided throughout with a series of laterally projecting light diffusing points, substantially as described.

2. The combination with a head light lens, of a thin flxebile transparent film-like member shaped to be fitted over the face of the lens and provided throughout with a multitude of laterally projecting light diffusing bulges or points, substantially as described.

3. A diffusing device for head lights consisting of a flexible transparent imperforate member adapted to constitute the exposed face of the lamp, and shaped with laterally projecting light diffusing projections merged at all edges into the body of said member to flex therewith while maintaining a completely closed cover.

In testimony whereof I hereunto affix my signature in the presence of two witnesses.

CHARLES H. MUCKENHIRN.

Witnesses:

GENEVIEVE O'BRIEN.
CALVIN T. MILANS.